United States Patent [19]

Thompson et al.

[11] 3,946,761

[45] Mar. 30, 1976

[54] PACKER FOR SEALING PIPE LEAKS

[75] Inventors: William B. Thompson; James T. Conklin, both of Orlando, Fla.

[73] Assignee: The Penetryn System, Inc., Winter Park, Fla.

[22] Filed: June 24, 1974

[21] Appl. No.: 482,442

[52] U.S. Cl. .................................. 138/98; 138/93
[51] Int. Cl.² ........................................ F16L 55/16
[58] Field of Search ................... 138/97, 98, 93, 89

[56] References Cited
UNITED STATES PATENTS

| | | | |
|---|---|---|---|
| 2,807,937 | 10/1957 | Rhodes | 138/93 |
| 3,103,235 | 9/1963 | Stringham | 138/97 |
| 3,267,967 | 8/1966 | Guthrie | 138/97 |
| 3,269,421 | 8/1966 | Telford | 138/97 |
| 3,618,639 | 11/1971 | Daley et al. | 138/93 |
| 3,834,422 | 9/1974 | Larson | 138/97 |

Primary Examiner—Houston S. Bell, Jr.
Assistant Examiner—L. Footland
Attorney, Agent, or Firm—Duckworth, Hobby & Allen

[57] ABSTRACT

A packer apparatus for the internal sealing of pipe leaks having a cylindrical structure and a single sleeve located on the exterior of the cylinder. The single sleeve has a pair of inflatable chambers connected together in spaced relationship to each other and air hoses connect through the cylinder to each of the inflatable chambers for inflating and deflating the chambers remotely with air pressure. Chemical lines are connected through the cylinder and through the sleeve between the inflatable chambers. The cylindrical structure is made of two or more segments and is collapsible for reducing the size of the packer. The single sleeve is made of rubber reinforced with tire chord and is held to the cylinder only by the connections with the chemical and air lines.

17 Claims, 5 Drawing Figures

PACKER FOR SEALING PIPE LEAKS

BACKGROUND OF THE INVENTION

1. Field of the Invention

The present invention relates to the internal sealing of pipe leaks and especially to sleeve type packers for use with fast setting chemical grouts. The present packer apparatus is especially adapted for use in those systems in which a television camera in a waterproof housing may be pulled through a sewer line to detect leaks in the sewer pipe and assist in positioning the packer for sealing of the leak by remote control from a mobile unit located near an access to the sewer line.

Sewer pipes frequently develop leaks at the joints between sections of the pipe. Prior to the development of television cameras and internal pipe sealing equipment, the repair of subterranean pipe lines to correct the infiltration of water or the exfiltration of sewage had been to excavate along the pipe to locate the leak and repair the pipe. This, however, was time consuming and expensive or it was difficult to locate the exact site of a leak in the pipe. This resulted in experimentations for better ways of locating leaking joints and resulted in waterproof cameras such as TV cameras having lighting for pulling through the pipe line to examine the interior of the pipe line for leaks and structural damage. Once a fault or leak was located with a camera, a hole would be drilled to a spot near the leak and sealing material fed through conduits could repair the leak. This particular method and apparatus was described in the claims in U.S. Pat. No. 2,971,259 entitled METHOD AND APPARATUS FOR DETERMINING THE POSITION OF SEWER LEAKS, by Robert F. Hanau and Edward D. Toole and assigned to the assignee of the present invention. The next step in the evolution of repairing sewer lines involved the development of a mechanism for internally sealing a pipe leak having a packer movable within a pipe along its length for injecting a plugging material into the leak. Such a packer was described in U.S. Pat. No. 3,168,908 for a mechanism for the internal sealing of a pipe leak by James A. Zurbrigen and Jack C. Steinsberger and assigned to the assignee of the present invention. This type of sealing packer was used in association with an enclosed television camera to provide a method for sealing and repairing internal leaks in sewer lines by moving the packer along the pipe until a leak was detected by the television camera and a target located a fixed distance from the packer positioned under the leak, then advancing the packer a predetermined distance to place the packer directly over the leak and isolating the leak with the packer and injecting sealing material. This method was illustrated in U.S. Pat. No. 3,168,909 for a method of locating and sealing pipe leaks by James A. Zurbrigen and Jack C. Steinsberger and assigned to the assignee of the present invention. An improved packer mechanism for use for fast gelling chemical grouts was provided in the U.S. Pat. No. 3,103,235 entitled SLEEVE PACKER FOR CHEMICAL GROUTING by Edward D. Stringam, III and assigned to the assignee of the present invention in which a sleeve type packer was provided having a cylinder covered by an inflatable sleeve and banded at each end and having another band placed over the sleeve and in the middle thereof to provide a packer adapted for fast gelling grouts. One improved packer for use with fast gelling grouts was illustrated in U.S. Pat. No. 3,618,639 entitled PACKER FOR SEALING PIPE LEAKS by Daniel R. Daley and Clark J. Crooker and Thurman Soles and assigned to the assignee of the present invention, which illustrates a packer designed for rapid assembly of standard components and for rapid disassembly for repair or replacement of components. A method and apparatus for more precisely locating leaks in pipes utilizing a packer apparatus is described in U.S. Pat. No. 3,750,711 by James T. Conklin and James B. Rogers and assigned to the assignee of the present invention which packer uses air pressure or air flow fed into the void area in a pipe between the inflated end portions of a packer to detect leaking pipe joints.

The present invention provides for an improved packer apparatus which is especially useful in larger sewer lines in which the sewer pipe may have a greater diameter than the manhole opening and which may also require higher pressures in the inflatable sleeves and greater variation in pipe size for the use of a single packer. One prior art problem overcome by the present invention involves the banding or clamping of inflatable sleeves to cylinders which creates stress concentration where the sleeve may fail by breaking or coming loose due to the strain of expansion during inflation.

SUMMARY OF THE INVENTION

A pipe sealing mechanism is provided having a cylindrical structure with a single sleeve having a pair of annular inflatable chambers located around the exterior of the cylinder. The packer is provided with means for directing fluids, such as air, into each inflatable chamber for inflating the chambers with the fluid pressure. Means are also provided for directing chemical grouts through the cylinder and through that portion of the sleeve connecting the inflatable chambers. The inflatable chambers can be inflated to isolate a void area within the pipe between the chambers. Chemical grouts may then be directed into the void area for sealing a leak in the sewer pipe. The packer cylinder is segmented with at least one pair of abutting edges being disconnectedly connected and which other abutting edges may be hinged so that the cylinder may be collapsed for reducing its size for passing through the smaller opening and then reassembled for use in a pipe line. The single sleeve is made of rubber reinforced with tire chord, biased to allow the annular chambers to expand during inflation and providing higher inflation capability. The sleeve is placed on the cylinder with nipples passing through openings in the cylinder where fluid lines are connected for inflating the inflatable chambers and for injecting the chemical grouts into the void area for sealing pipe leaks. These connections are the only retaining attachments between the cylinder and the sleeve.

BRIEF DESCRIPTION OF THE DRAWINGS

Other objects, features and advantages of this invention will be apparent from a study of the written description and the drawings in which:

FIG. 4 is a perspective view of the cylinder in accordance with the embodiment of FIG. 2 in the process of being folded and FIG. 5 is a cut-away detailed perspective view of the base segment of a packer in accordance with the embodiment of FIG. 2.

DESCRIPTION OF THE PREFERRED EMBODIMENTS

Figure 1:
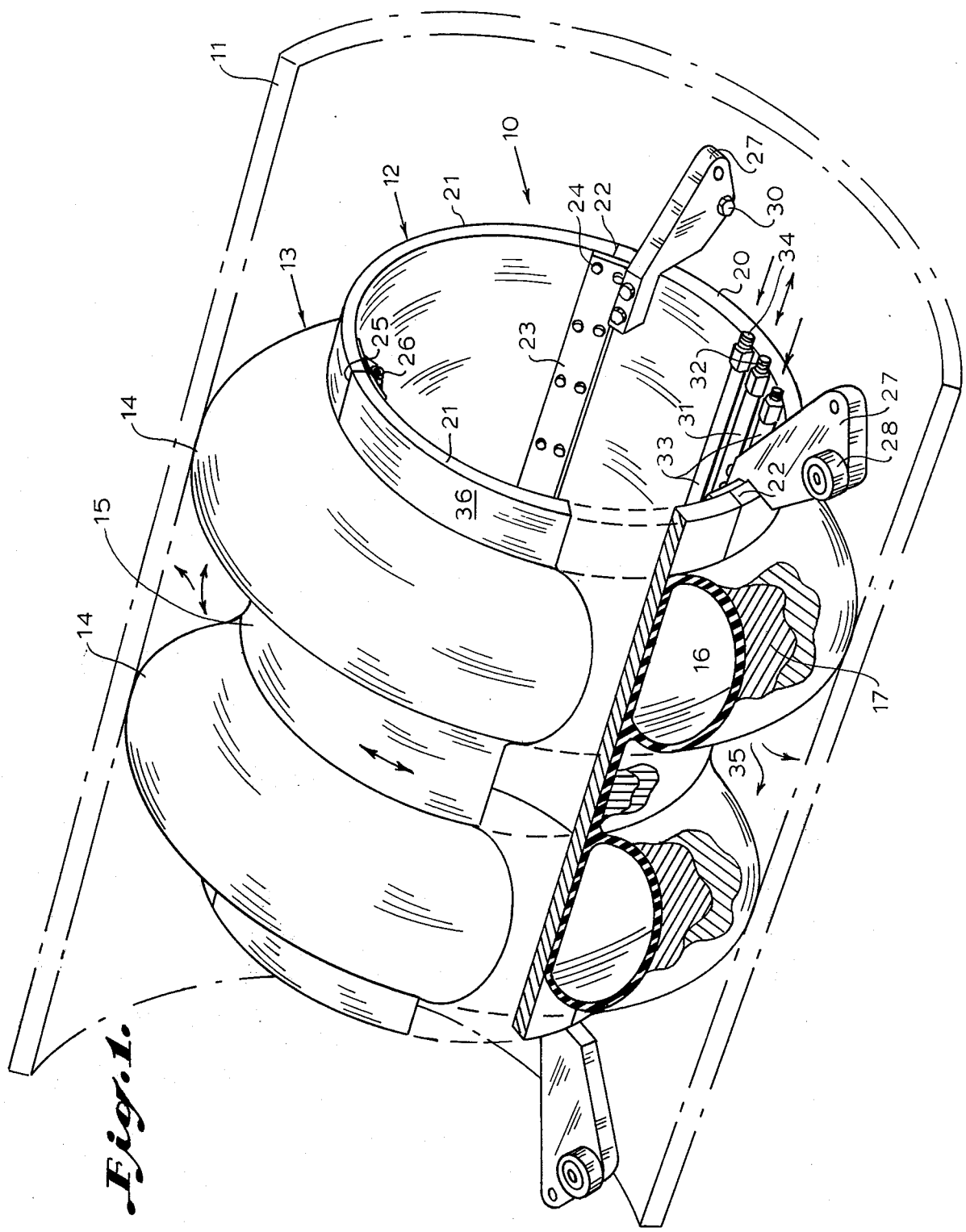
FIG. 1 is a cut-away perspective view of a packer according to the invention and is illustrated inflated in a pipe line.

FIG. 1 of the drawings illustrates a packer 10 for sealing pipe leaks inside of a pipe 11 and having a cylinder 12 with a sleeve 13 placed thereon. The single sleeve 13 has a pair of annular inflatable chambers or mandrels 14 spaced apart by center portion 15. Sleeve 13 is formed in one piece with annular inflatable chamber interiors 16 and connecting portion 15 formed together with flexible rubber or similar material and has tire chord 17 reinforcing in the walls of the inflatable chambers 14 to add greater strength to the sleeve. The reinforcing also limits expansion of the inflatable chambers. The packer cylinder 12 has a base segment 20 along with one or more segments 21 which are formed with the abutting edges 22 attached together. Abutting segment edges 22 are attached by plate 23 with bolts 24 to fasten the segments together and allow the bolts to be removed and the segments separated. Abutting edges 25 are connected with a hinge 26 to allow the segments 21 to be folded on the hinges 26 to collapse or reduce the size of the cylinder 12, when the abutting edges 22 are disconnected, so that the cylinder 12 can be folded on the hinge 26. The base segment 20 has a pair of skids 27 on each end having a wheel or roller 28 which may be a ball bearing type roller secured with a bolt 30 thereto for allowing the packer 10 to slide on skids when the packer 10 is being pulled through the pipe 11 so as to keep the single sleeve 13 from dragging against the pipe in its deflated position. The base segment 20 has an air line 31 with a coupling 32 thereon which is connected to both of the inflatable chambers 14 through the cylinder segment 20 (not shown in this view) which allows the chambers 14 to be simultaneously inflated and deflated remotely during operation. A pair of chemical grout lines 33 having couplings 34 are both connected through the segment 20 to openings passing through the sleeve center portion 15 to allow chemical grouts to be directed into the void area 35 formed between the inflated chambers 14, the pipe 11 interior wall, and the sleeve center portion 15. In operation, the assembly would normally be used with a TV camera or other means for locating a leak in a subterranean sewer line, aligning the packer 10 over the leak, and inflating the chambers 14 by means of the air line 31 until the chambers 14 seat against the internal surface of the pipe 11. A void area 35 is thus formed which is then filled with chemical grouts under pressure through grout lines 33. Chemical grouts are forced into the leak and rapidly set to seal the leak at which point the chambers 14 can be deflated and the packer pulled along to the next leak to be repaired. Packer 10 is adapted for use with large sewer lines and requires substantial strength in the cylinder 12 to withstand the pressure required to inflate the chambers 14, sealing off a void area 35 and in applying the chemical grouts. The reinforced chambers 14 with reinforcing 17 limits expansion of the chambers by allowing the chambers to be inflated from a flattened out deflated position extending along surface 36 to the inflated position which deforms the chambers to an elliptical shape. Sleeve 13 is attached to the cylinder 12 only at the points of connection with the lines 31 and 33. Thus, the chambers 14 can change shape without excessive stress, as required with most other types of sleeve packers which are attached at each end to the cylinder 12. Having enclosed chambers 14 allows a segmented cylinder 12 inasmuch as there is no leakage of air through the cylinder 12. Large packers need a collapsible structure in order for the cylinder 12 to fit through the manhole opening which will frequently be smaller than the pipe 11. The cylinder 12 would then have to be reassembled by unfolding and attaching abutting segments back together, for use in large sewer lines. Sleeve 13 can be made of rubber and the reinforcing material can be rayon tire chord but it should be clear that other flexible reinforcing material and other flexible wall material can be utilized without departing from the spirit and scope of the invention.

Figure 2:
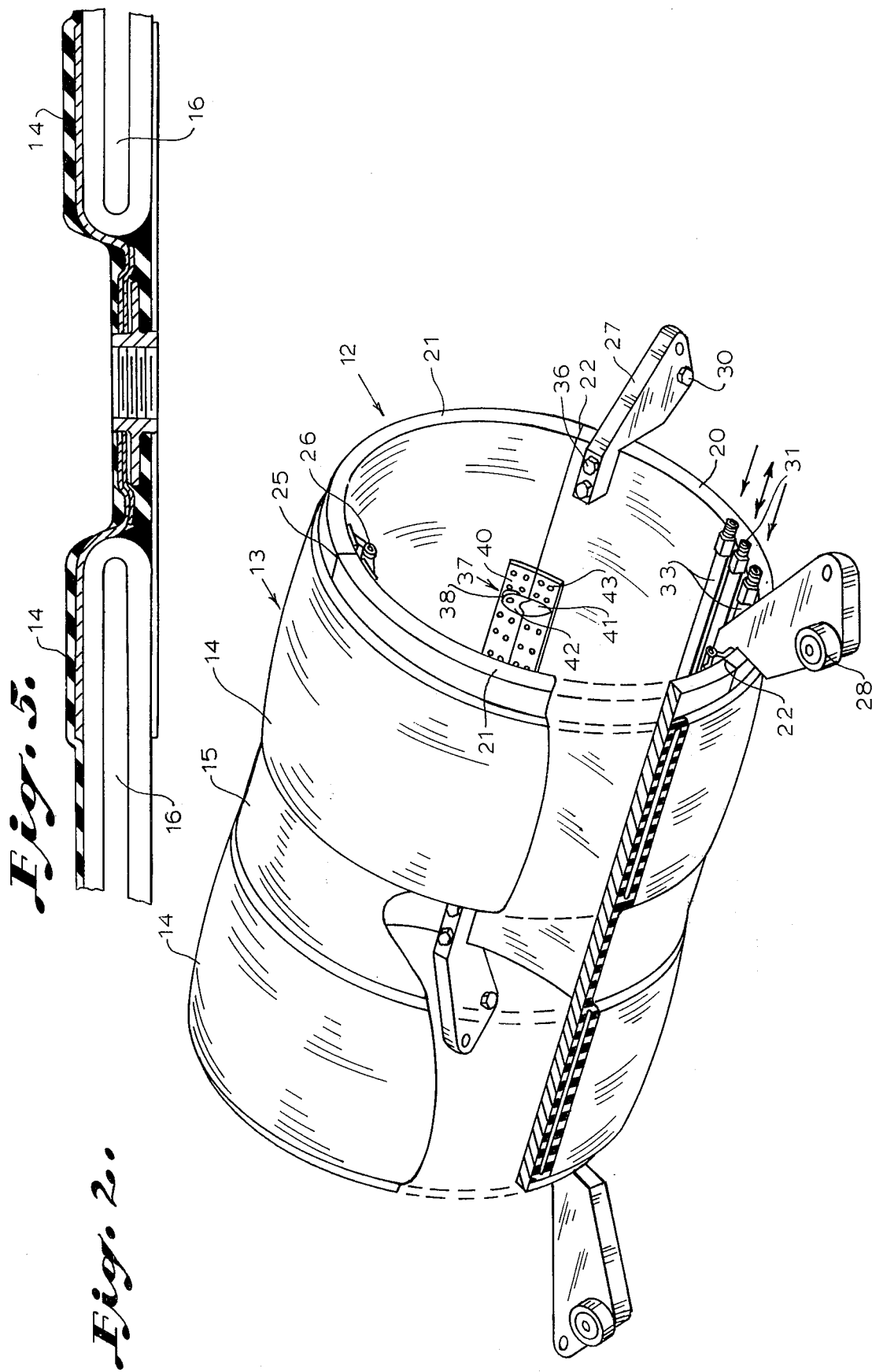
FIG. 2 is a perspective view of a second embodiment of a packer in accordance with the present invention, and is illustrated deflated.

Turning now to FIGS. 2 and 5, cylinder 12 is illustrated in a modified embodiment having the sleeve 13 in position thereon, with each of the inflatable chambers 14 deflated and in their flattened out position on each side of the sleeve center portion 15. The cylinder has a base segment 20 having the air line 31 and the chemical lines 33 connected thereto and has skids 27 having wheels or rollers 28 secured with bolts 30 to the skids 27. The skids are attached with bolts 36 to the base segment 20. It should be clear that the other segments 21 may also have skids attached to protect the packer from scraping along the internal surface of the pipe, especially on small packers where the packer is more likely to roll over. The abutting segment edges 22 are attached together in this embodiment by a latching mechanism 37 having a hook 38 connected to a plate 40 on segment 21 adjacent the abutting edges 22 and having a toggle latch 41 with a loop 42 for engaging the hook or catch 38. The latching mechanism 37 is fastened to reinforcing plate 43 on the base segment 20. Two or more of these latching mechanisms 37 would normally be used on a segment of a large packer and may be quickly unsnapped and the segments 21 folded on the hinges 26 at the abutting edges 25 of the segments to fold a packer cylinder 12 to a reduced size quickly, as well as to rapidly unfold and reassemble the cylinder.

Figure 3:
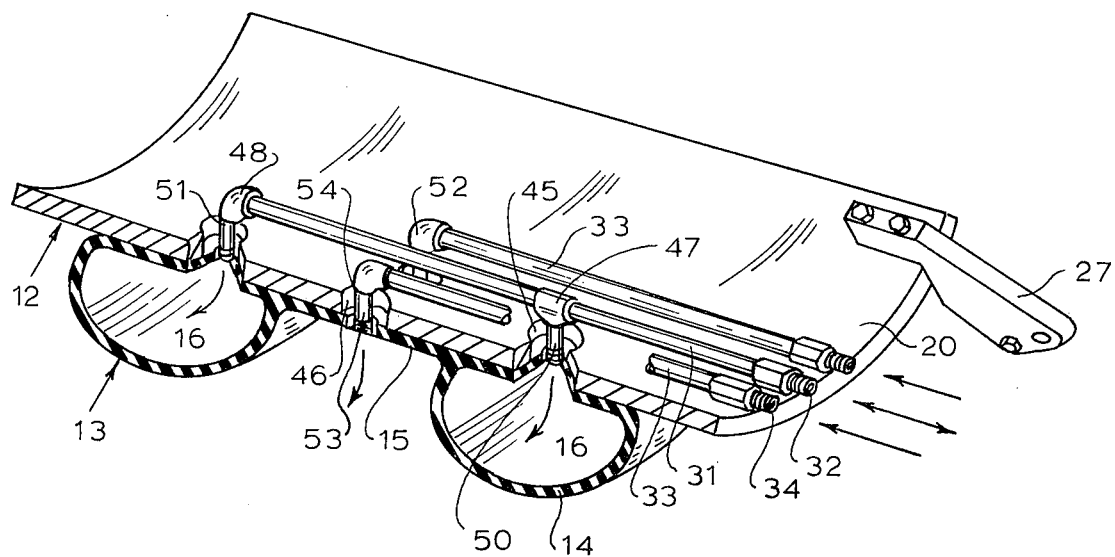
FIG. 3 is a cut-away perspective view of the base segment of a packer in accordance with the embodiment of FIG. 1.

Referring to FIG. 3, the base segment 20 of the cylinder 12 is more clearly illustrated having a plurality of openings 45 and a plurality of openings 46 therethrough. An air line 31 having a coupling 32 is shown connected at tee 47 and elbow 48 to nipples 50 which connect the interior 16 of the chambers 14 through the openings 45 to the air line 31. The nipples 50 have threaded ends 51 for attachment to the air line but are attached with a connection which allows rapid disconnection of the sleeve for removal and replacement of the sleeve as desired. Grout lines 33 have couplings 34 for connection to hoses extending to the surface from the subterranean pipe line and each has an elbow 52 on the end thereof. The center portion 15 between the inflatable chambers 14 also has a pair of nipples 53 having threaded ends 54 for connecting to the elbows 52 for rapidly connecting the grout lines 33 through the openings 46 in the base segment 20 and also through the sleeve center portion 15 for injecting chemical grouts into the void area for sealing pipe leaks. The connection of the nipples 50 and 53 advantageously retains the single sleeve 13 on the cylinder 12 without further attachment and leaves each end of the single sleeve free to change shape during inflation. One of the skids 27 is also illustrated in this view.

Figure 4:
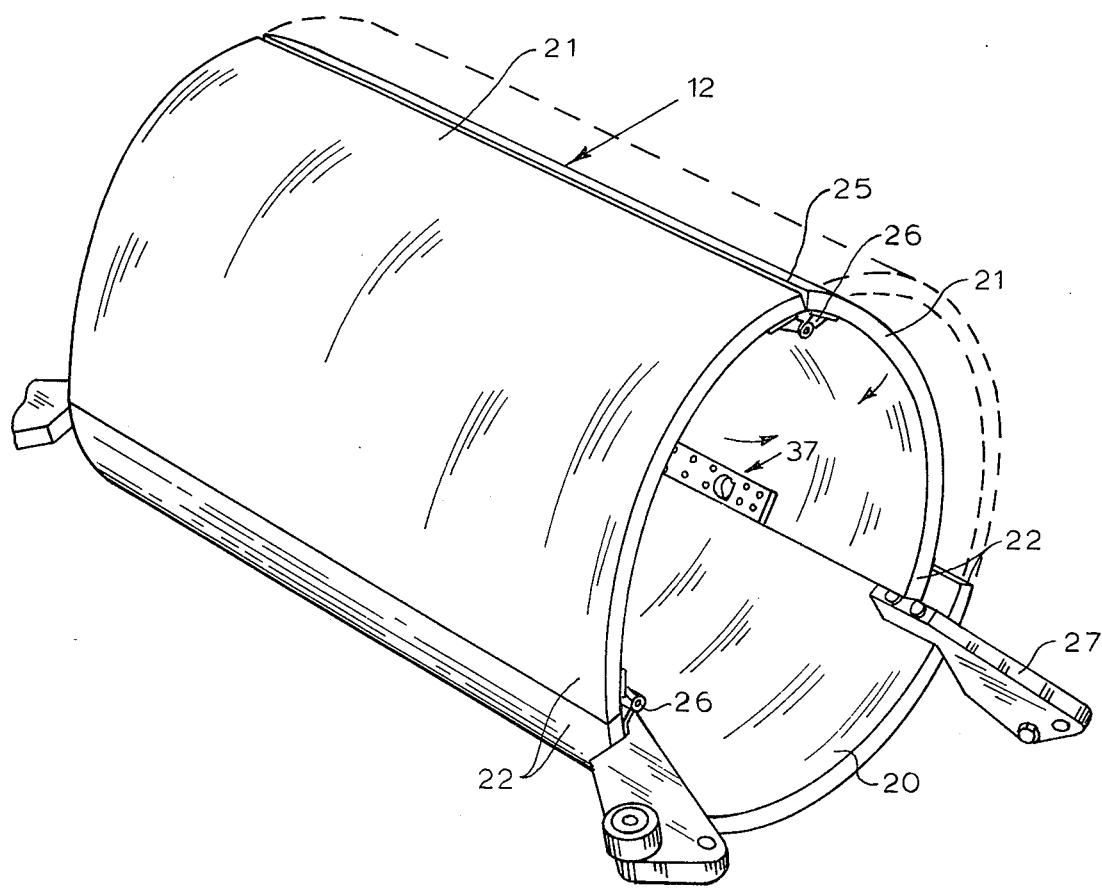

FIG. 4 illustrates the folding operation of the cylinder 12 in which the abutting edges 22 between the base segment 20 and the other segments 21 have been disconnected and segments 21 are being folded on a hinge 26. It should be realized that a hinge is generally required for each pair of abutting edges 25. Cylinder 12 is illustrated in FIG. 4 as having three segments with abutting edges 22 released by the latching mechanism 37 and folding one segment 21 towards the next. The pair of segments 21 is folded down to the base segment 20. A more complete size reduction can be obtained by having one segment 21 smaller than its adjacent segment 21 so that each segment may fold adjacent to the other without preventing the folding of the next segment. It should of course be clear that a plurality of several segments can be utilized depending upon the size and strength required for a particular packer cylinder without departing from the spirit and scope of the invention. The cylinder 12 can be made of any material desired such as heavy gauge aluminum or steel. It should be clear at this point that a packer apparatus for internal sealing of pipes from a remote location has been provided which can be utilized with TV cameras, chemical grouts, compressed air or other pressurized fluids. However, this invention is not to be construed as limited to the particular forms disclosed herein since these are to be regarded as illustrative rather than restrictive.

I claim:

1. A pipe leak sealing apparatus for sealing pipes internally comprising:
    a segmented hollow cylindrical structure having a plurality of openings therein and having a base segment and at least one foldable segment for partially collapsing said cylindrical structure;
    a single sleeve having a pair of annular inflatable chambers formed in said sleeve, said single sleeve being located on said cylindrical structure;
    means for directing fluid under pressure into each said annular inflatable chamber to inflate said chambers and to deflate said chambers by the removal of fluid from said chambers;
    means for directing settable chemical grouts through said cylindrical structure and through said single sleeve between said pair of inflatable chambers whereby chemical grouts may flow into a void area between said inflatable chambers when inflated in a pipe and the adjacent internal surface of the pipe for sealing a leak in the pipe;
    said single sleeve having a pair of annular, inflatable chambers of a flexible material, reinforced therein with reinforcing chord whereby greater inflated strength is provided for said chamber and each said chamber has a nipple passing through a cylindrical structure opening and operatively connected to said means for directing fluid thereinto, and said sleeve having an annular spacing portion connecting said inflatable chambers together in spaced relationship, said spacing portion of said sleeve being operatively connected to said means for directing settable chemical grouts between said cylinder for directing said chemical grouts through said connection portion of said sleeve; and
    said single sleeve being held onto the exterior of said cylinder by the connections with said means for directing fluid into said chambers and the connections with said means for directing chemical grouts through the spacing portion between said inflatable chambers.

2. The apparatus in accordance with claim 1 in which said annular chambers have connecting means for removably connecting said means for directing fluid thereinto.

3. The apparatus in accordance with claim 2 in which said annular chamber connecting means are threaded.

4. The apparatus in accordance with claim 1 in which said single sleeve inflatable chambers are rubber annular chambers.

5. The apparatus in accordance with claim 4 in which said sleeve inflatable chambers are reinforced with rayon chord.

6. The apparatus in accordance with claim 1 in which said base segment has a plurality of skids having rollers thereon attached thereto.

7. The apparatus in accordance with claim 6 in which said cylinder folding segments are each hinged to at least one other segment for folding relative thereto.

8. A pipe leak sealing apparatus for internally sealing pipes comprising:
    a collapsible, segmented, generally cylindrical structure;
    a single sleeve containing a pair of annular inflatable chambers located on said cylinder;
    means for directing fluid under pressure into each said annular inflatable chamber to inflate said chambers and to deflate said chambers by the removal of fluid from said chambers;
    means for directing settable chemical grouts through said cylinder between said pair of inflatable chambers whereby grouts may flow into a void area between said inflatable chambers when inflated against the internal surface of a pipe for sealing a leak in a pipe;
    said collapsible segmented cylinder having at least two segments having one pair of adjacent edges disconnectably connected together for collapsing said cylinder by disconnecting said set of adjacent segments and said collapsible segmented cylinder having at least one hinge connecting adjacent edges of additional segments abutting edges together whereby disconnecting one set of adjacent segments allows folding said segmented cylinder for collapsing and reassembling said cylinder.

9. The apparatus in accordance with claim 1 in which said disconnectably connected cylindrical segments includes a latching mechanism for removably latching said segments together in a rigid manner.

10. The apparatus in accordance with claim 9 in which said latching mechanism includes a catch on one segment and a toggle latch on the other segment for latching said latch to said catch to hold said segments together.

11. The apparatus in accordance with claim 1 in which said cylindrical segments includes different sized segments so that smaller segments can fold under larger segments.

12. The apparatus in accordance with claim 1 in which one of said cylindrical segments is a base segment having openings therethrough for connecting said inflatable chambers through to said means for directing fluid thereinto and said base segment has skids attached thereto for sliding said apparatus along a pipe line.

13. The apparatus in accordance with claim 12 in which said cylindrical base segment skids have rollers attached thereto for rolling said apparatus along a pipe line.

14. The apparatus in accordance with claim 1 in which said pair of annular inflatable chambers are connected together and spaced to form a single sleeve held to said cylinder by the connections of said means for directing fluid to said inflatable chambers and by the connections to said means to direct chemical grouts through said cylinder, said means for directing chemical grouts passing through said connection between said inflatable chambers.

15. The apparatus in accordance with claim 14 in which annular inflatable chambers are flexible material, reinforced with tire chord.

16. A packer apparatus for sealing leaks in pipes comprising:
- a collapsible, segmented, cylindrical structure, at least two segments being disconnectedly connected together at abutting edges for at least partially collapsing said cylinder, at least one segment of said cylinder having at least one connected abutting edge and at least one pair of said cylinder segments abutting edges being hinged to fold said cylinder;
- a single sleeve having a pair of annular inflatable chambers surrounding the exterior of said cylindrical structure; said inflatable chambers having flexible reinforcing material formed therein and at least one opening thereinto;
- means for directing fluid under pressure into each said annular inflatable chamber through the opening thereinto to inflate said chambers and to deflate said chambers by the removal of fluid from said chambers;
- means for directing settable chemical grouts through said cylinder and through said single sleeve connection portion between said pair of inflatable chambers whereby chemical grouts may flow into a void area formed by said inflated chambers and the internal surface of a pipe for sealing a leak located in said void area.

17. The apparatus in accordance with claim 16 in which said sleeve annular chambers are flexible, annular chambers reinforced with a flexible substantially non-elastic chord and connected in spaced relationship to each other by a flexible material.

* * * * *